(12) United States Patent
Ohara (10) Patent No.: US 7,576,879 B2
(45) Date of Patent: Aug. 18, 2009

(54) METHOD OF CONNECTING TERMINAL DEVICE TO PRINTER

(75) Inventor: Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1043 days.

(21) Appl. No.: 10/647,303

(22) Filed: Aug. 26, 2003

(65) Prior Publication Data

US 2005/0248803 A1    Nov. 10, 2005

(30) Foreign Application Priority Data

Aug. 28, 2002  (JP) ............................. 2002-248063

(51) Int. Cl.
*G06F 3/12* (2006.01)
*G06K 15/00* (2006.01)

(52) U.S. Cl. ..................... 358/1.15; 358/1.13; 358/1.14

(58) Field of Classification Search ................. 358/1.1, 358/1.2, 1.6, 1.9, 1.13, 1.14, 1.15, 1.16, 1.17, 358/1.18, 407, 468; 710/8, 11, 14, 15, 17, 710/18, 62, 63, 64, 65, 72; 709/203, 220, 709/223, 224, 225, 230, 237; 399/1, 8; 347/2, 347/3, 5, 14, 23

See application file for complete search history.

(56) References Cited

U.S. PATENT DOCUMENTS

| | | | | | |
|---|---|---|---|---|---|
| 5,228,118 | A | * | 7/1993 | Sasaki ...................... | 358/1.13 |
| 5,303,336 | A | * | 4/1994 | Kageyama et al. ........ | 358/1.15 |
| 5,636,333 | A | * | 6/1997 | Davidson et al. .......... | 358/1.15 |
| 6,178,004 | B1 | | 1/2001 | Ochiai ....................... | 358/1.14 |
| 6,611,350 | B1 | * | 8/2003 | Watanabe .................. | 358/1.15 |
| 2002/0049837 | A1 | | 4/2002 | Kato ......................... | 709/223 |

FOREIGN PATENT DOCUMENTS

| | | |
|---|---|---|
| JP | A 05-292141 | 11/1993 |
| JP | A 09-259079 | 10/1997 |
| JP | A 10-74132 | 3/1998 |
| JP | A 10-283136 | 10/1998 |
| JP | A 10-308790 | 11/1998 |
| JP | A 11-112775 | 4/1999 |
| JP | A 2000-35930 | 2/2000 |
| JP | A 2000-165435 | 6/2000 |
| JP | A 2000-172600 | 6/2000 |
| JP | A 2002-202871 | 7/2002 |

* cited by examiner

*Primary Examiner*—Dov Popovici
(74) *Attorney, Agent, or Firm*—Oliff & Berridge, PLC (57) ABSTRACT

There is provided a method of connecting a terminal device to a target printer to be used on a network. The method includes the steps of receiving from an external device information regarding printing protocols, and determining a printing protocol for connecting the terminal device to the target printer based on the information received.

17 Claims, 10 Drawing Sheets

```
>GET-NEXT-REQ tcp ConnLocalPort.0.
  <GET-RESPONSE tcp ConnLocalPort.0.0.0.0.21.0.0.0.0.0  VALUE 21
>GET-NEXT-REQ tcp ConnLocalPort.0.0.0.0.21.0.0.0.0.0
  <GET-RESPONSE tcp ConnLocalPort.0.0.0.0.23.0.0.0.0.0  VALUE 23
>GET-NEXT-REQ tcp ConnLocalPort.0.0.0.0.23.0.0.0.0.0
  <GET-RESPONSE tcp ConnLocalPort.0.0.0.0.139.0.0.0.0.0  VALUE 139
>GET-NEXT-REQ tcp ConnLocalPort.0.0.0.0.139.0.0.0.0.0
  <GET-RESPONSE tcp ConnLocalPort.0.0.0.0.515.0.0.0.0.0  VALUE 515
>GET-NEXT-REQ tcp ConnLocalPort.0.0.0.0.515.0.0.0.0.0
  <GET-RESPONSE tcp ConnLocalPort.0.0.0.0.613.0.0.0.0.0  VALUE 613
>GET-NEXT-REO tcp ConnLocalPort.0.0.0.0.613.0.0.0.0.0
  <GET-RESPONSE tcp ConnLocalPort.0.0.0.0.9100.0.0.0.0.0  VALUE 9100
>GET-NEXT-REO tcp ConnLocalPort.0.0.0.0.9100.0.0.0.0.0
  <GET-RESPONSE tcp ConnLocalPort.0.0.0.0.21.0.0.0.0.0(ip address)0.0.0.0
```

Related Art

METHOD OF CONNECTING TERMINAL DEVICE TO PRINTER

BACKGROUND OF THE INVENTION

The present invention relates to a method of connecting a terminal device to a printer on a network.

Various types of printing protocols such as an LPR, PORT9100, IPP and NetBIOS have been widely used for connection control between a terminal device and a printer. The printing protocol defines a communication protocol for transmitting printing data between the terminal device and the printer.

Figure 14:
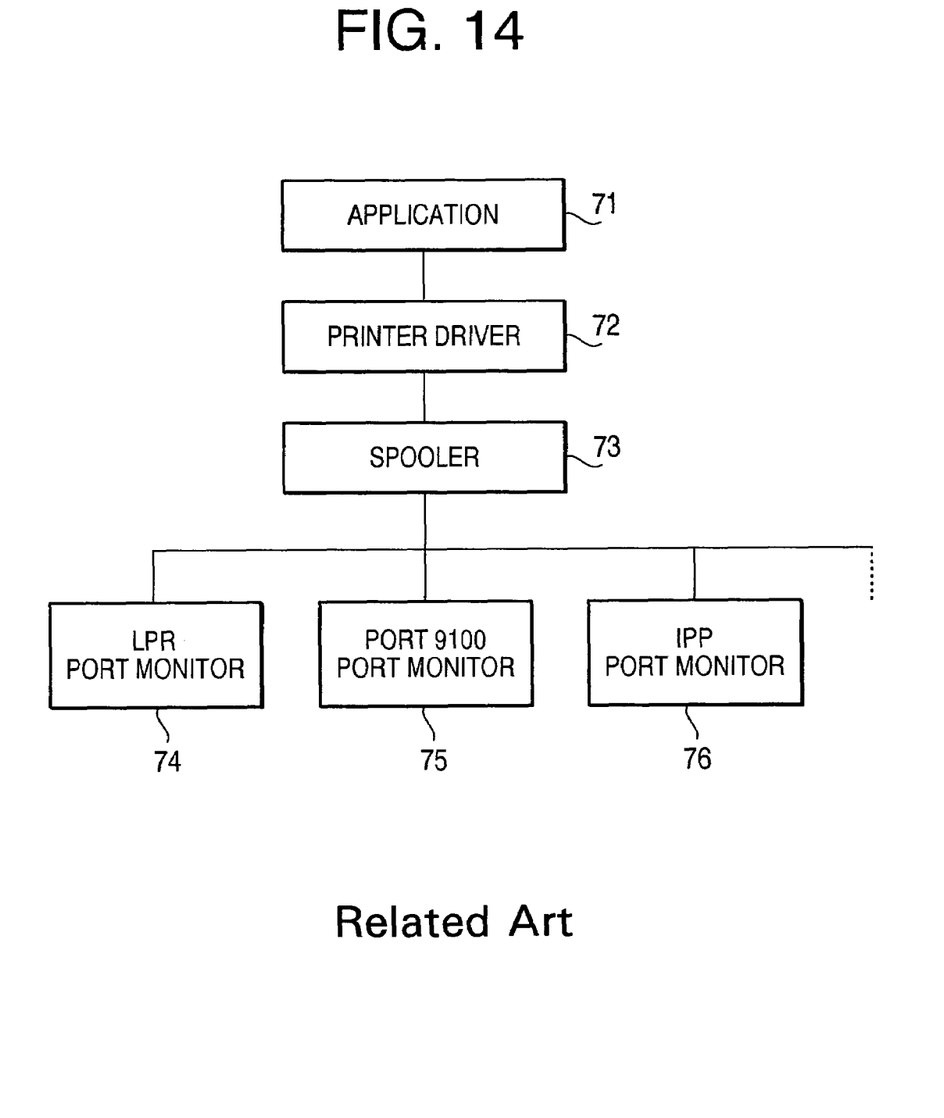
FIG. 14 shows a hierarchical structure of software as to printing operation.

If an operating system running on the terminal device is Windows®, a program called Port Monitor installed in the terminal device operates according to the printing protocol so as to connect with the printer. FIG. 14 shows a hierarchical structure of software concerning printing operation. As shown in FIG. 14, print data outputted by an application program 71 is passed to a spooler 73 through a printer driver 72. After the print data is buffered and managed in the spooler 73, the print data is transmitted to the printer by a port monitor corresponding to the printer to be used.

As shown in FIG. 14, the hierarchical structure of software as to printing operation includes an LPR Port Monitor 74, a PORT9100 Port Monitor 75 and an IPP Port Monitor 76, which operate according to the LPR protocol, the PORT9100 protocol and the IPP protocol, respectively.

Conventionally, various types of network management protocols have been developed. Among them, an SNMP (Simple Network Management Protocol) is well known for its versatility that it runs on a TCP/IP (Transmission Control Protocol/Internet Protocol) network environment. According to the SNMP network management technology, an SNMP manager which corresponds to a monitoring device for managing the network environment and an SNMP agent which corresponds to a monitored device on which the SNMP is mounted are provided.

The SNMP manager sends a query to the SNMP agent to obtain information concerning the network environment, then the SNMP agent responds to the query from the SNMP manager. The information concerning the network environment of the SNMP agent is referred to as an MIB (Management Information Base), and individual pieces of information defined by the MIB are referred to as management objects. That is, the SNMP manager gathers the information (the MIB) from the SNMP agent, recognizes the network environment, and manages the network.

However, if a user prints out a document through a network on which various types of printers using different types of printing protocols are connected, the user is required to recognize a printing protocol which a target printer (i.e., a printer which the user has determined to use) supports, to install the printing protocol which the target printer supports onto the user's terminal device, and to set up the installed printing protocol. For example, if the user uses a terminal device on which Windows® runs, the user is required to install a proper Port Monitor which the target printer supports, and to set up the installed Port Monitor. It is very burdensome for the user to conduct above mentioned installation procedure of the proper printing protocol so as to print out documents.

SUMMARY OF THE INVENTION

The present invention is advantageous in that a method of connecting a terminal device to a target printer to be used on a network is provided, which can reduce a burden on a user who wants to print out a document via the network on which various types of printers are connected.

According to an aspect of the present invention, there is provided a method of connecting a terminal device to a target printer to be used on a network. The method has the steps of receiving information from a terminal device regarding printing protocols, and determining a printing protocol for connecting the terminal device to the target printer based on the information received.

With this method, it becomes possible to automatically determine the printing protocol for connecting to the target printer. Accordingly, it is unnecessary for the user to set up the printing protocol of the user's terminal device so as to be consistent with the printing protocol of the target printer.

Optionally, the method further may have the step of sending a request for the information regarding printing protocols from the terminal device to the external device on the network before the receiving step. In this case, the information regarding printing protocols is transmitted from the external device to the terminal device.

In a particular case, the external device may be one of a server and the target printer.

Optionally, the information regarding printing protocols may be broadcasted by the external device on the network.

In a particular case, the external device may be one of printers on the network. Alternatively, the external device may be a server on the network.

In a particular case, the external device may broadcast the information regarding printing protocols when the external device is switched on. Additionally or alternatively, the external device may broadcast the information regarding printing protocols at predetermined time intervals.

Optionally, the method may have the step of connecting from the terminal device to the target printer in accordance with the printing protocol determined by the determining step.

Still optionally, the determining step may include comparing printing protocols which the terminal device supports with a printing protocol contained in the received information, and the receiving step may be repeated until the printing protocol contained in the received information coincides with one of the printing protocols which the terminal device supports. In this case, the printing protocol which firstly identified to be consistent with the one of the printing protocols which the terminal device supports is used to connect the terminal device to the target printer.

Still optionally, the method may have the step of defining priority levels regarding printing protocols. In this case, the determining step may include comparing the printing protocols which the terminal device supports with printing protocols contained in the received information to determine if there are matches, and selecting one printing protocol having a highest priority level from among the matches.

In a particular case, the defining step may include defining the priority levels of printing protocols which the terminal device supports at the terminal device.

Alternatively, the defining step may include defining the priority levels which the target printer supports at the target printer.

In a particular case, the request may be sent according to a Simple Network Management Protocol, and the information regarding printing protocols may include information managed according to a Management Information Base.

Optionally, the method may have the steps of storing the printing protocol for connecting to the target printer determined in the determining step and information for locating the target printer in a memory, and in advance determining whether the target printer has already been stored in the memory. In this case, if the target printer has been stored in the memory, the connecting step is performed without performing the receiving step and the determining step.

In a particular case, the information for locating the target printer may include at least one of an IP address of the target printer and a name of the target printer.

According to another aspect of the invention, there is provided a method of connecting a terminal device to a target printer to be used on a network. The method has the steps of sending a request for information regarding printing protocols which a target printer to be used supports from the terminal device to an external device on the network, and determining a printing protocol for connecting to the target printer based on the information replied by the external device.

With this method, it becomes possible to automatically determine the printing protocol for connecting to the target printer. Accordingly, it is unnecessary for the user to set up the printing protocol of the user's terminal device so as to be consistent with the printing protocol of the target printer.

In a particular case, the external device may be a server on the network. Alternatively, the external device may be the target printer.

According to another aspect of the present invention, there is provided a method of connecting a terminal device to a target printer to be used on a network. The method has the steps of sending a request for the information regarding printing protocols which a target printer to be used supports from the terminal device to the target printer, determining a printing protocol for connecting to the target printer based on the information replied by the target printer, and connecting to the target printer in accordance with the determined printing protocol.

With this method, it becomes possible to automatically determine the printing protocol for connecting to the target printer. Accordingly, it is unnecessary for the user to set up the printing protocol of the user's terminal device so as to be consistent with the printing protocol of the target printer.

According to another aspect of the present invention, there is provided a method of controlling a connection between a terminal device and a printer on a network. The method has the steps of transmitting information regarding printing protocols from an external device on the network to the terminal device, and connecting form the terminal device to the printer in accordance with the information transmitted from the external device to the terminal device.

With this method, it becomes possible to automatically connect from the terminal device to the printer. Accordingly, it is unnecessary for the user to set up the printing protocol of the users' terminal device so as to be consistent with the printing protocol of the printer.

According to another aspect of the invention, there is provided a terminal device, which is provided with an interface to connect with a network, and a connection control system that receives information including printing protocols which a target printer to be used supports from an external device on the network, and determines a printing protocol for connecting the terminal device to the target printer based on the received information.

With this configuration, it becomes possible to automatically determine the printing protocol for connecting to the target printer. Accordingly, it is unnecessary for the user to set up the printing protocol of the user's terminal device so as to be consistent with the printing protocol of the target printer.

According to another aspect of the invention, there is provided a printer, which includes an interface to connect with a network, and an information output system that broadcasts information regarding printing protocols through the interface.

Since the printer can provide the information regarding the printing protocols for a user's terminal device, it is unnecessary to set up a printing protocol of the user's terminal device so as to be consistent with the printing protocol of the printer.

According to another aspect of the invention, there is provided a printer, which includes an interface to connect with a network, and an information output system that outputs printing protocols which the printer supports through the interface according to predetermined priority levels concerning the printing protocols.

With this configuration, a user's terminal device can receive printing protocols from the printer and can use one of the printing protocols having a certain priority level determined by the printer.

According to another aspect of the invention, there is provided a terminal device, which includes an interface to connect with a network, and a connection control system that receives information regarding printing protocols from an external device on the network and compares printing protocols which the terminal device supports with a printing protocol contained in the received information. In this structure, the connection control system repeats the receiving and the comparing until the printing protocol contained in received information coincides with one of the printing protocols which the terminal device supports, and the connection control system uses a printing protocol which firstly identified to be consistent with one of the printing protocols which the terminal device supports so as to connect the terminal device to a target printer.

With this configuration, it becomes possible to automatically determine a printing protocol for connecting to a target printer. Accordingly, it is unnecessary for a user to set up the printing protocol of the user's terminal device so as to be consistent with the printing protocol of the target printer.

According to another aspect of the invention, there is provided a terminal device, which includes an interface to connect with a network, and a connection control system that sends a request for information regarding printing protocols which a target printer to be used supports to an external device on the network and determines a printing protocol for connecting to the target printer based on the information replied by the external device.

Since the printing protocol of the target printer is provided by the external device on the network, it is unnecessary for a user to set up the printing protocol of the user's terminal device so as to be consistent with the printing protocol of the target printer.

The device and method according to the present invention can be realized when appropriate programs are provided and executed by a computer. Such programs may be stored in recording medium such as a flexible disk, CD-ROM, memory cards and the like and distributed. Alternatively or optionally, such programs can be distributed through networks such as the Internet.

DETAILED DESCRIPTION OF THE EMBODIMENTS

Hereafter, embodiments according to the invention are described with reference to the accompanying drawings.

Figure 1:
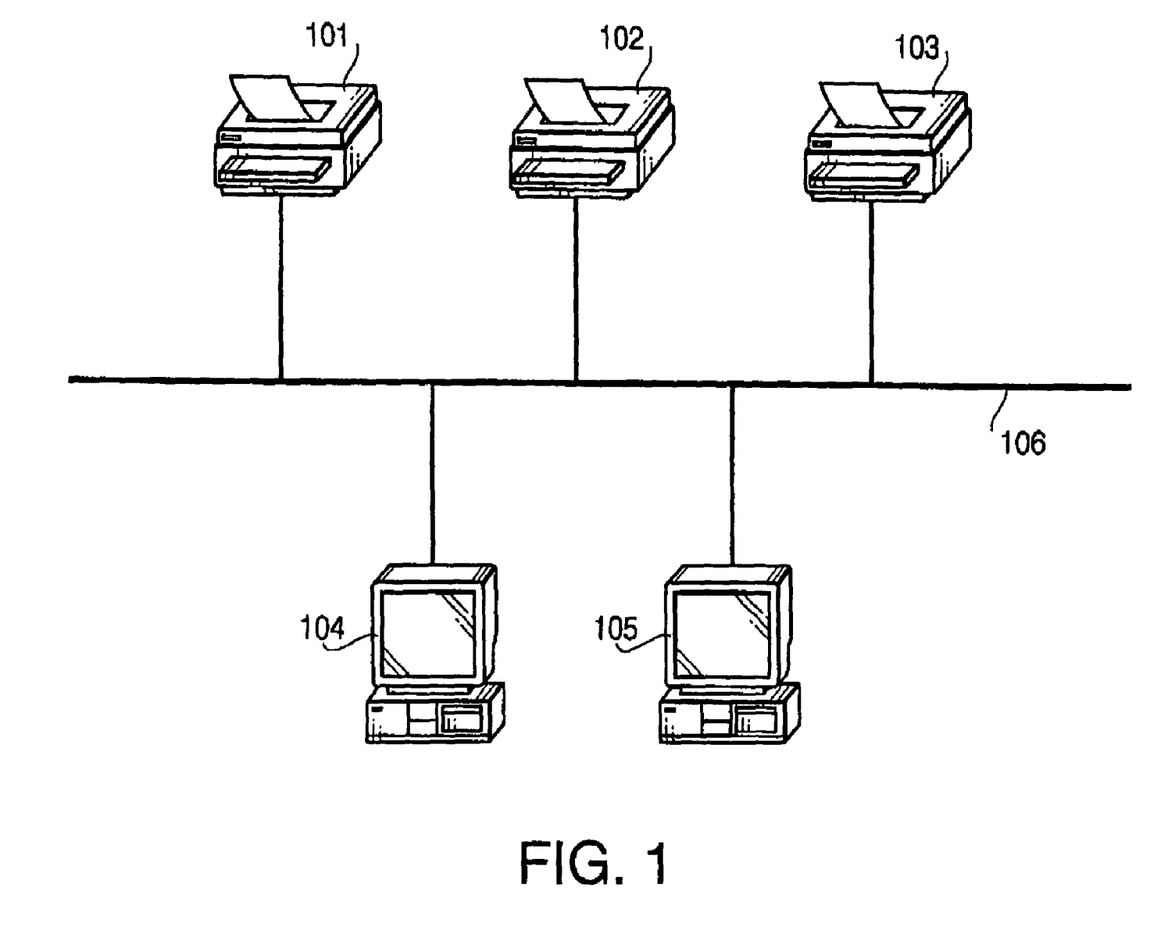
FIG. 1 shows a network configuration to which embodiments of the present invention can be applied.

FIG. 1 shows a network configuration to which embodiments of the present invention can be applied. As shown in FIG. 1, printers 101, 102 and 103, and terminal devices 104 and 105 are interconnected via a network 106, which is, for example, a LAN (Local Area Network) or a wireless LAN.

Each of the printers 101-103 which are configured to print out documents on sheets of paper includes a network interface for communicating with the terminal devices 104 and 105.

Each of the terminal devices 104 and 105 may be a PC (personal computer) on which an operating system such as Windows® and Mac OS® runs. Further, each of the terminal devices 104 and 105 includes a network interface for communicating with the printers 101-103 according to a printing protocol. Also, the terminal devices 104 and 105 communicate with each other via the network 106.

In the embodiments of the invention, an SNMP is used to send a query about the printing protocol from the terminal devices to the printers. In FIG. 1, the terminal devices 104 and 105 serve as SNMP managers and the printers 101-103 serve as SNMP agents.

Figure 2:
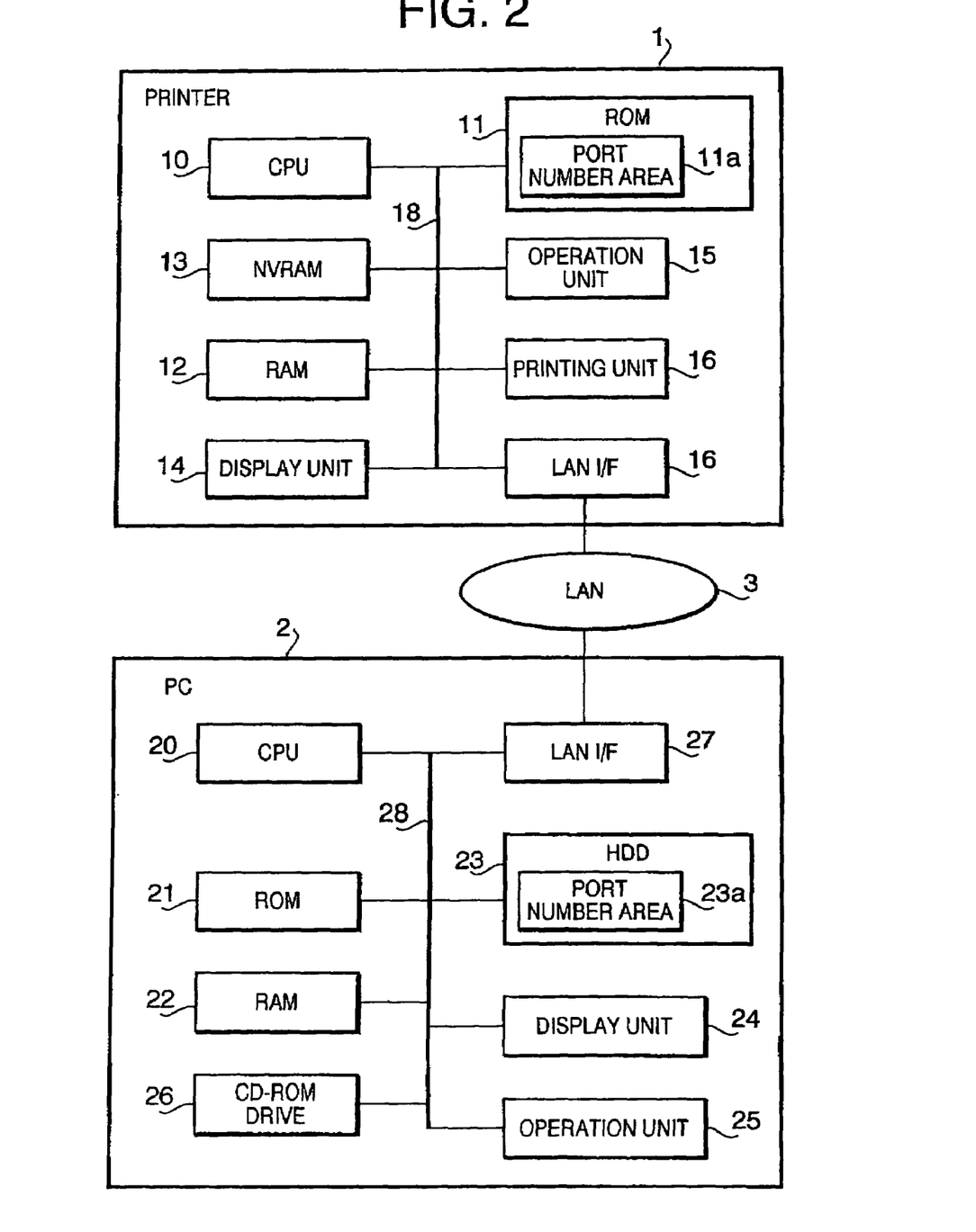
FIG. 2 shows a block diagram of a network system corresponding to the network configuration shown in FIG. 1.

FIG. 2 shows a block diagram of a network system corresponding to the network configuration shown in FIG. 1. In FIG. 2, a printer 1 corresponds to one of the printers 101-102, and a PC (personal computer) 2 corresponds to one of the terminal devices 104 and 105. The printer 1 and the PC 2 are connected with each other via a LAN 3 which corresponds to the network 106 shown in FIG. 1.

As shown in FIG. 2, the printer 1 includes a CPU (Central Processing Unit) 10, a ROM (Read Only Memory) 11, a RAM (Random Access Memory) 12, a NVRAM (Non Volatile RAM) 13, a display unit 14, an operation unit 15, a printing unit 16, and a LAN interface (LAN I/F) 17 which are connected to each other via a system bus 18. The printer 1 has the function of the SNMP agent.

The CPU 10 which controls all of units of the printer 1 has various functions such as analyzing instructions from the PC 2 and printing out documents via the printing unit 16.

The ROM 11 constitutes a part of a main memory used by the CPU 10, and has a port number area 11a in which port numbers supported by the printer 1 are stored. That is, the port number area 11a is a part of the MIB which is a database concerning management objects of the printer 1. It should be noted that the port numbers vary depending on the types of printing protocols.

Similarly to the ROM 11, the RAM 12 constitutes a part of the main memory, and serves as a spool for print data. The NVRAM 13 stores some setting parameters which are to be rewritten. It should be noted that the port number area 11a may be provided in another memory, for example, in the NVRAM 13 so that the port numbers of the printing protocols which the printer 1 supports can be changed.

The display unit 14, on which various types of information such as functions of the printer 1 are displayed, is connected to the system bus 18 through an input/output interface (not shown). The display unit 14 may be a liquid crystal display.

The operation unit 15 which is an interactive input device is connected to the system bus 18 via an input/output interface (not shown). The operation unit 15, which may be a panel on which a predetermined number of push switches are arranged, is used to set up the functions of the printer 1.

The printing unit 16 is a device having the function of forming color images or monochrome images on sheets of paper, and is connected to the system bus 18 via an input/output interface (not shown). The printing unit 16 performs printing operation according to instructions from the CPU 10.

The LAN I/F 17 enables the printer 1 to communicate with the PC 2 via the LAN 3. For example, the print data and information regarding the SNMP are passed between the printer 1 and the LAN 3 via the LAN I/F 17.

As shown in FIG. 2, the PC 2 includes a CPU (Central Processing Unit) 20, a ROM (Read Only Memory) 21, a RAM (Random Access Memory) 22, a HDD (Hard Disc Device) 23, a display unit 24, an operation unit 25, a CD-ROM drive 26, and a LAN interface (LAN I/F) 27 which are connected to each other via a system bus 28. The PC 2 has the function of the SNMP manager.

The CPU 20 which controls all of units of the PC 2 has various functions, such as, reading out from the HDD 23 a connection control program for connecting the PC 2 to the printer 1, and executing the connection control program.

The ROM 21 constitutes a part of a main memory which the CPU 20 uses, and stores, for example, a program for booting up an operating system. Similarly to the ROM 21, the RAM 22 constitutes a part of the main memory of the PC 2.

The HDD 23, which is a readable and writable storage device, stores various types of data, for example, the print data which is to be sent to the printer 1, and the connection control program. Further, the HDD 23 has a port number area 23a in which a port number table, a received port number table and a known printer table are stored.

The display unit 24, on which various types of information concerning, for example, functions of the PC 2 are displayed, is connected to the system bus 28 through an input/output interface (not shown). The display unit 24 is, for example, a CRT (Cathode Ray Tube) display or a liquid crystal display.

The operation unit 25 which is an interactive input device such as a keyboard or a mouse is connected to the system bus 28 via an input/output interface (not shown). The operation unit 25 is used to enter various data as to functions of the PC 2.

The CD-ROM drive 26 which reads data recorded on a CD-ROM is connected to the system bus 28 via an input/output interface (not shown). The CD-ROM drive 26 may be replaced with another storage device such as a flexible disc drive unit.

The LAN I/F 27 enables the PC 2 to communicate with the printer 1 via the LAN 3. For example, the print data and information regarding the SNMP are passed between the PC 2 and the LAN 3 via the LAN I/F 27.

Hereinafter, four embodiments which embody the present invention will be described.

First Embodiment

A first embodiment of the present invention will be described with reference to FIGS. 3-5. In this embodiment, the PC 2 is a user's terminal device, and the printer 1 is a target printer which the user intends to use to print out documents.

Figure 3:
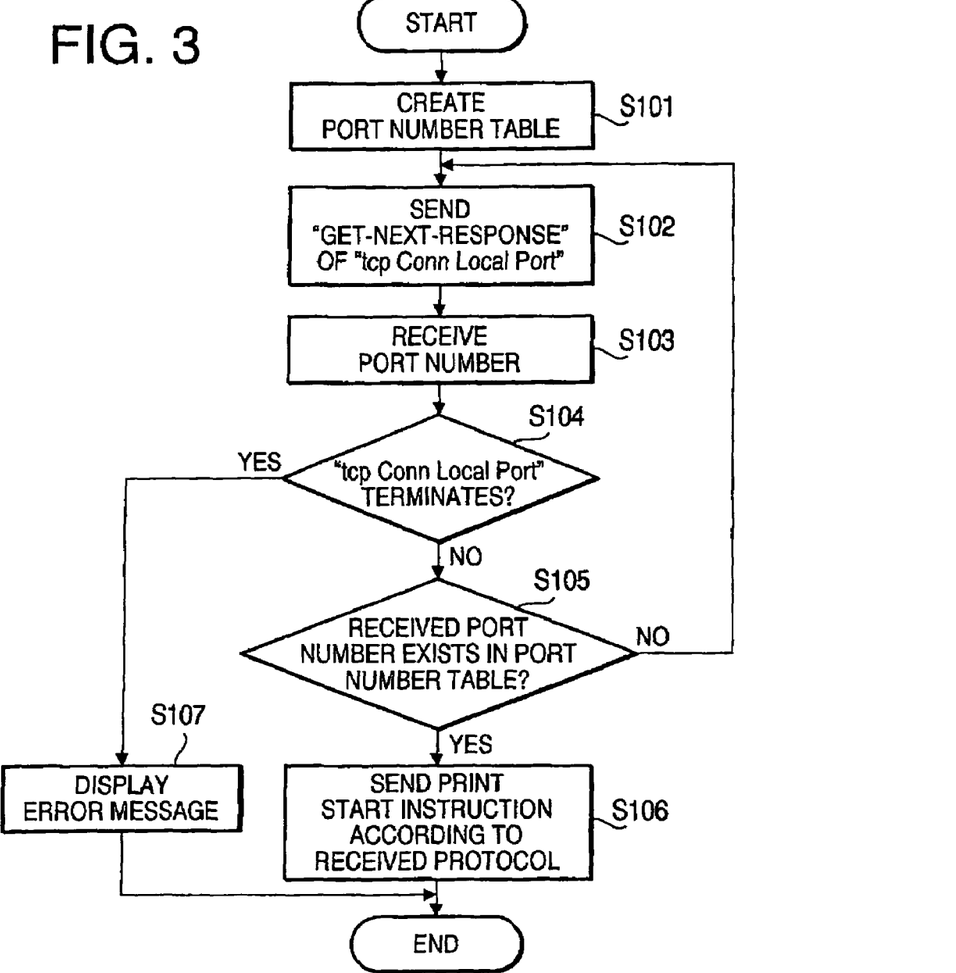
FIG. 3 is a flowchart illustrating a connection control process between a PC and a printer according to a first embodiment.
Figure 4:
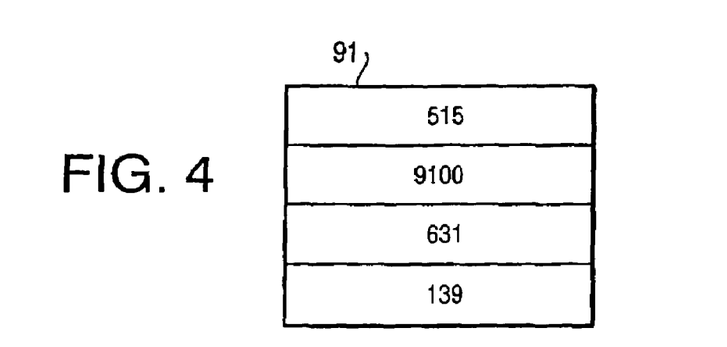
FIG. 4 is an example of a port number table generated and used by the PC.

FIG. 3 is a flowchart illustrating a connection control process for connecting the PC 2 to the printer 1. FIG. 4 is an example of the port number table generated and used by the PC 2. FIG. 5 shows an example as to requests and responses transferred between the printer 1 and the PC 2. It should be noted that the connection control process shown in FIG. 3 is executed under control of the CPU 20 in the PC 2.

As shown in FIG. 3, initially, the CPU 20 generates the port number table 91, and stores the port number table 91 in the port number area 23a (step S101). As shown in FIG. 4, in the port number table 91, port numbers of printing protocols which the PC 2 supports are registered. In the example of FIG. 4, the port numbers 515, 9100, 631 and 139 represent printing protocols of the LPR, the PORT9100, the IPP and the NetBIOS, respectively.

It should be noted that if Windows® runs as the OS on the PC 2, the port numbers are automatically stored in the port number area 23a when the Port Monitors are installed in the PC 2.

Next, the CPU 20 requests the printer 1 to send a value of a "tcpConnLocalPort" (i.e., the printing protocol which the printer 1 supports) by transmitting to the printer 1 through the LAN 3 a request "GET-NEXT-REQUEST" of SNMP (step S102). The "GET-NEXT-REQUEST" is a request which the SNMP manager transmits to the SNMP agent so as to obtain a next piece of information related to the management objects.

Next, the CPU 20 receives from the printer 1 a response "GET-RESPONSE" which contains the port numbers stored in the port number area 11a (step S103). The "GET-RESPONSE" is a response to the command "GET-NEXT-REQUEST", and is sent from the SNMP agent to the SNMP manager.

The "tcpConnLocalPort" is one of the management objects of MIB, and represents a local port number of a TCP/IP connection. Also, the "tcpConnLocalPort" is a piece of information of a "tcpConnTable" which is used to monitor a condition of the TCP/IP connection. The order of a series of information contained in the "tcpConnTable" is "tcpConnState"→"tcpConnLocalAddress"→"tcpConnLocalPort"→"tcpConnRemAddress"→"tcpConnRemPort".

In step S104, the CPU 20 determines whether a next piece of information does not exist in the "tcpConnLocalPort". That is, the CPU 20 determines whether the "tcpConnLocalPort" terminates.

Figure 5:
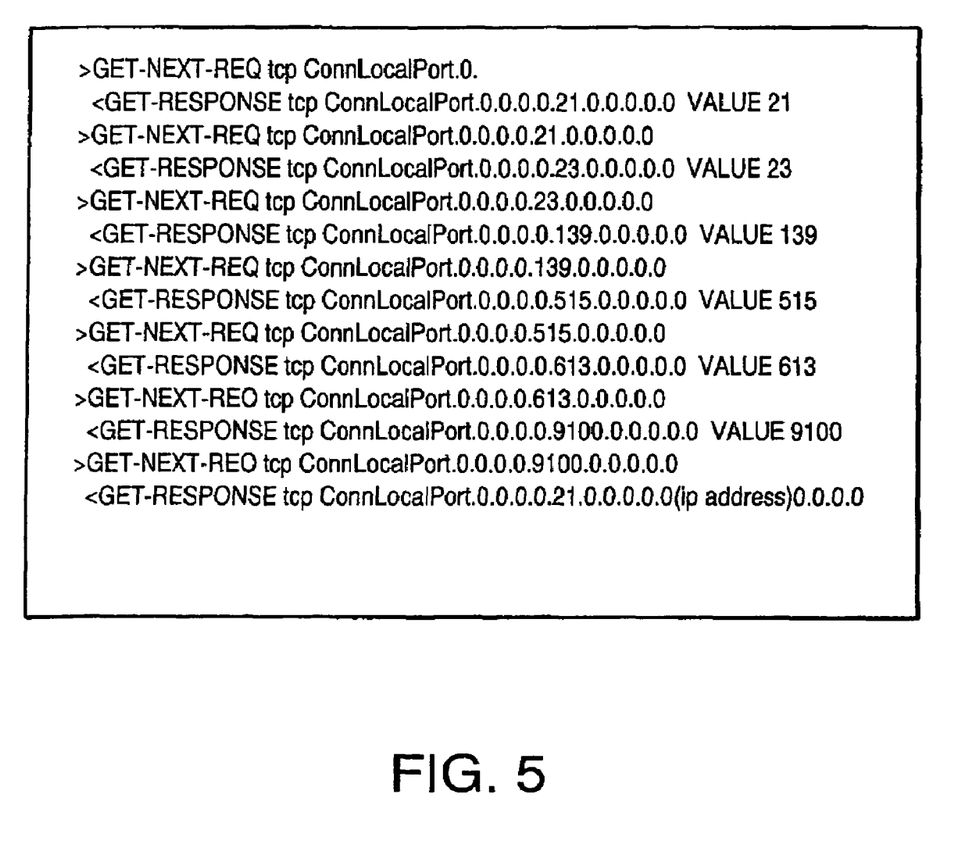
FIG. 5 shows an example as to requests and responses transferred between the printer and the PC.

More specifically, as shown in FIG. 5, if the "GET-NEXT-REQUEST" ("GET-NEXT-REQ") is transmitted along with a parameter "ConnLocalPort.0.", a next piece of information (i.e., a name and a value) of the "tcpConntable" is replied by the printer 1 according to the order of the series of information contained in the "tcpConnTable".

As shown in FIG. 5, by successively transmitting the "GET-NEXT-REQUEST" along with a name parameter replied to a previously transmitted "GET-NEXT-REQUEST", all the pieces of information contained in the "tcpConnTable" can be obtained. It should be noted that if the "GET-NEXT-REQUEST" is transmitted along with a name parameter of the last data in the "tcpConnLocalPort", a next piece of information "tcpConnRemAddress" is replied. Accordingly, the CPU 20 can determine whether the "tcpConnLocalPort" terminates in step 104 by determining whether a reply from the printer 1 is the "tcpConnRemAddress" or not.

If the CPU 20 determines that the "tcpConnLocalPort" does not terminate (S104:NO), the CPU 20 refers to the port number table 91 so as to determine whether the port number obtained from the printer 1 at step S103 exists in the port number table 91 (step S105). When the port number obtained from the printer 1 does not exist in the port number table 91 (S105:NO), control returns to step S102 where "GET-NEXT-REQUEST" is transmitted again.

When the port number obtained from the printer 1 exists in the port number table 91 (S105:YES), the CPU 20 transmits print data and instructs the printer 1 to start printing operation according to a printing protocol corresponding to the latest port number obtained at step S103. That is, the CPU 20 starts the printing operation according to the printing protocol supported by both of the printer 1 and the PC 2. Then, the connection control process shown in FIG. 3 terminates.

As can be seen from FIG. 3, if none of the port numbers obtained from the printer 1 exists in the port number table 91, the CPU 20 determines at step S104 that the "tcpConnLocalPort" terminates, and displays error messages on the display unit 24 because the printing operation can not be performed.

As described above, according to the first embodiment of the invention, the PC 2 automatically obtains the printing protocol which the target printer supports by sending "GET-NEXT-REQUEST" and receiving "GET-RESPONSE". Accordingly, it becomes unnecessary for the user to set up a printing protocol of the users' terminal device so as to be consistent with the printing protocol of the target printer.

It should be appreciated that the connection control process shown in FIG. 3 utilizes the SNMP and the MIB which are generic technologies widely used in the art.

Further, according to the connection control process shown in FIG. 3, the printing operation can be initiated promptly upon reception of the port number which both of the printer 1 and the PC 2 can use.

It should be noted that the series information of the "tcpConnLocalPort" may be arranged in order of descending priority. In this case, a printing protocol having highest priority can be selected in step S105 from among protocols which both of the printer 1 and the PC 2 support.

Second Embodiment

Figure 6:
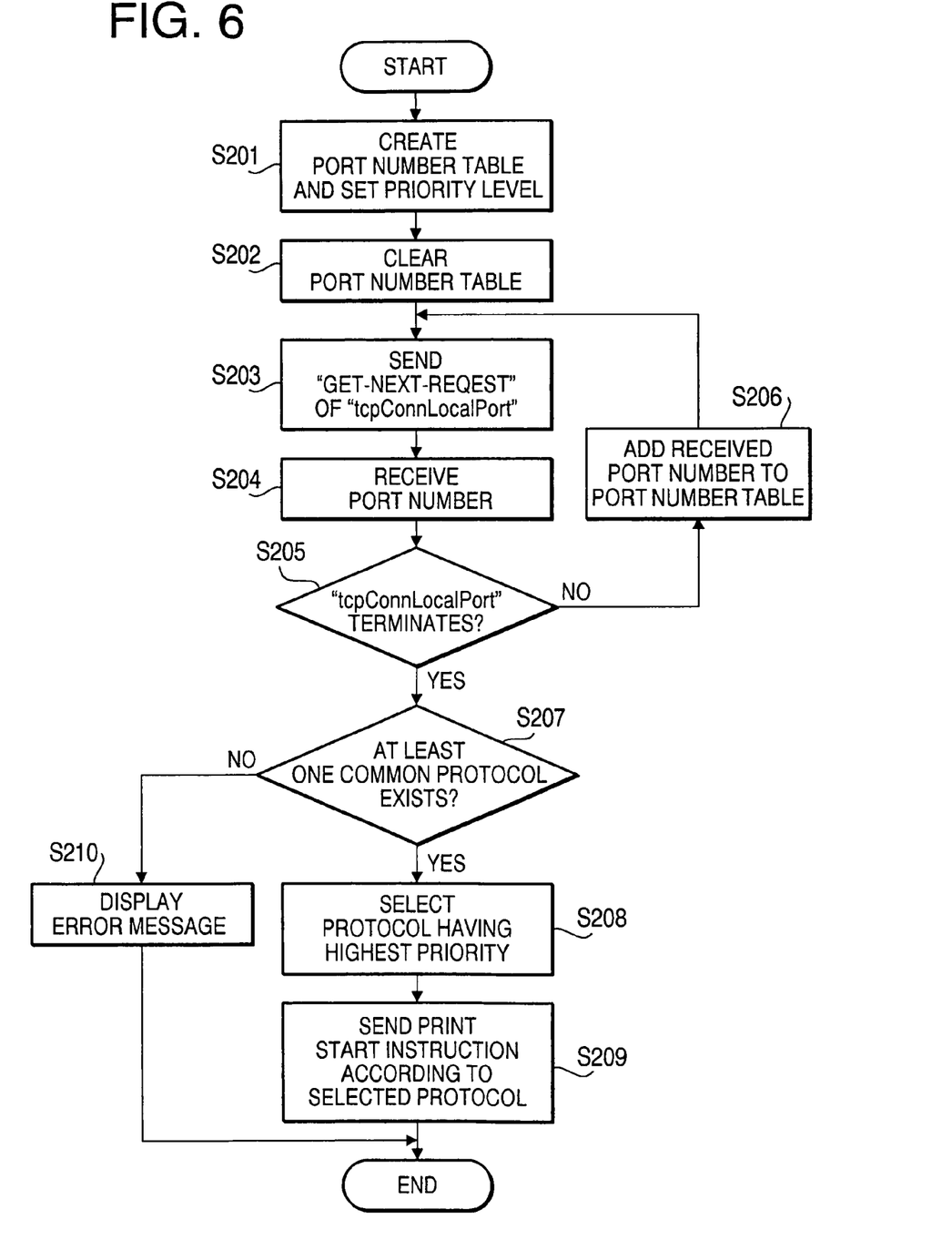
FIG. 6 is a flowchart illustrating a connection control process between the PC and the printer according to a second embodiment.
Figure 7:
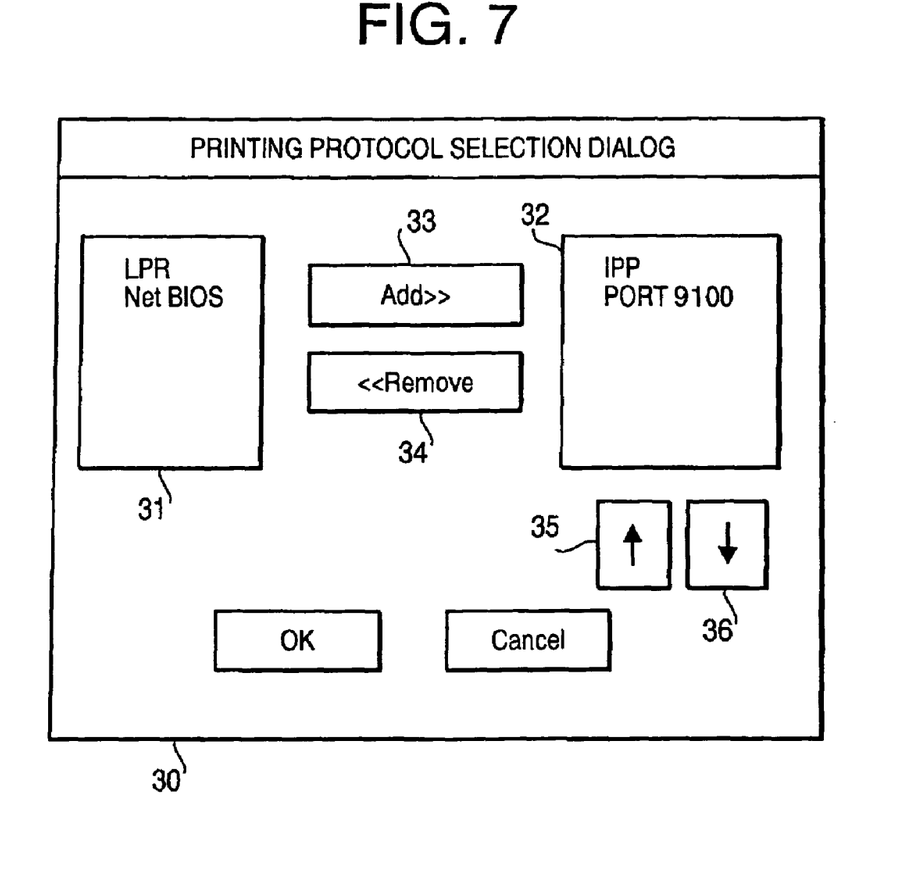
FIG. 7 shows an example of a dialog window on which the user inputs data for generating a port number table.
Figure 8:
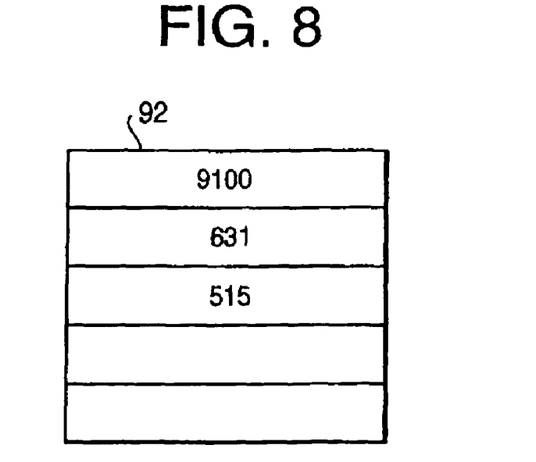
FIG. 8 is an example of a received port number table in which port numbers transmitted from the printer are registered.

A second embodiment of the present invention which relates to a connection control between the printer 1 (a target printer) and the PC 2 (a user's terminal device) will be described with reference to FIGS. 6-8. FIG. 6 is a flowchart illustrating a connection control process for connecting the PC 2 to the printer 1. FIG. 7 shows an example of a dialog window 30 on which the user inputs data for generating a port number table. FIG. 8 is an example of a received port number table 92 in which port numbers transmitted from the printer 1 are registered.

It should be noted that the connection control process shown in FIG. 6 is executed under control of the CPU 20 in the PC 2.

As shown in FIG. 6, the user makes the port number table through the use of the dialog window 30 and determines priority levels of printing protocols listed in the port number table (step S201).

More specifically, the CPU 20 generates and displays the dialog window 30 on the display 24 unit so as to generate the port number table and to determine the priority levels of the printing protocols in the port number table. In the dialog window 30, printing protocols which the PC 2 supports are listed in a dialog box 31. A dialog box 32 in which selected printing protocols are listed corresponds to the port number table.

The user selects one or more protocols which are to be stored in the port number table from among protocols listed in the dialog box 31 through the use of a "Add" button 33. The user can remove one or more protocols from the dialog box 32 through the use of a "Remove" button 34. The user can determine the priority levels of the printing protocols listed in the dialog box 32 through the use of an upward button 35 and a downward button 36.

In this example of the dialog window 30, a printing protocol listed on the top line of the dialog box 32 is assigned the highest priority, and a printing protocol listed on the bottom line of the dialog box 32 is assigned the lowest priority. The user can change the priority level of each of the protocols listed in the dialog box 32 by selecting one protocol from the dialog box 32 and then clicking the upward button 35 or the downward button 36.

The user may determine the priority level of each of the protocols in the port number table by considering items listed below:
a communication speed of a printing protocol;
an availability of the function of obtaining a device status;
an effect on network traffic; and/or
an adoption rate of a printing protocol.

Alternatively, the priority level of each of the protocols may be predetermined by a vender of each of the printing protocols. In this case, the user is not required to input the priority level to the PC 2.

In step S202, the CPU 20 clears data previously stored in the received port number table 92. As described below, printing protocols obtained in step S204 along with a "GET-RESPONSE" are stored in the received port number table 92.

Next, in step S203, the CPU 20 sends "GET-NEXT-REQUEST" of SNMP to the printer 1 so as to obtain vales of "tcpConnLocalPort", i.e., the port number of printing protocol which the printer 1 supports. In step S204, the CPU 20 receives from the printer 1 the port number which the printer 1 supports.

Next, the CPU 20 determines whether the "tcpConnLocalPort" terminates (S205). When the CPU 20 determines that the "tcpConnLocalPort" does not terminate (S205:NO), the CPU 20 stores the port number obtained at step S204 into the received port number table 92. Then, control returns to step S203 where the CPU 20 sends again the "GET-NEXT-REQUEST" so as to obtain another port number which the printer 1 supports.

When the CPU 20 determines that the "tcpConnLocalPort" terminates (S205:YES), the CPU 20 refers to the port number table (not shown) and the received port number table 92 so as to determine whether at least one of the protocols listed in the received port number table 92b exists in the port number table (S207). That is, at least one common protocol which is listed in both of the port number table and the received port number table 92 is searched.

When the CPU 20 determines that the at least one common protocol is found (S207:YES), one protocol having highest priority among the at least one common protocol is selected (S208). In step S209, the CPU 20 sends the print data and a print start instruction using the selected printing protocol so as to start printing operation. Then, the connection control process terminates.

When the CPU 20 determines that the at least one common protocol is not found (S207:NO), the CPU 20 display error messages on the display unit 24. Then, the connection control process terminates.

As described above, according to the second embodiment of the invention, the PC 2 automatically obtains the printing protocols which the target printer supports by sending "GET-NEXT-REQUEST" and receiving "GET-RESPONSE". Accordingly, the user is not required to set up a printing protocol of the users' terminal device so as to be consistent with the printing protocol of the target printer.

It should be appreciated that the connection control process shown in FIG. 6 is executed by using the SNMP and the MIB which are generic technologies widely used in the art.

Further, according to the connection control process shown in FIG. 3, since the printing protocol used for connecting to the printer 1 is determined according to the priority level which the user designates, an optimal printing protocol can be automatically selected.

Third Embodiment

Figure 9:
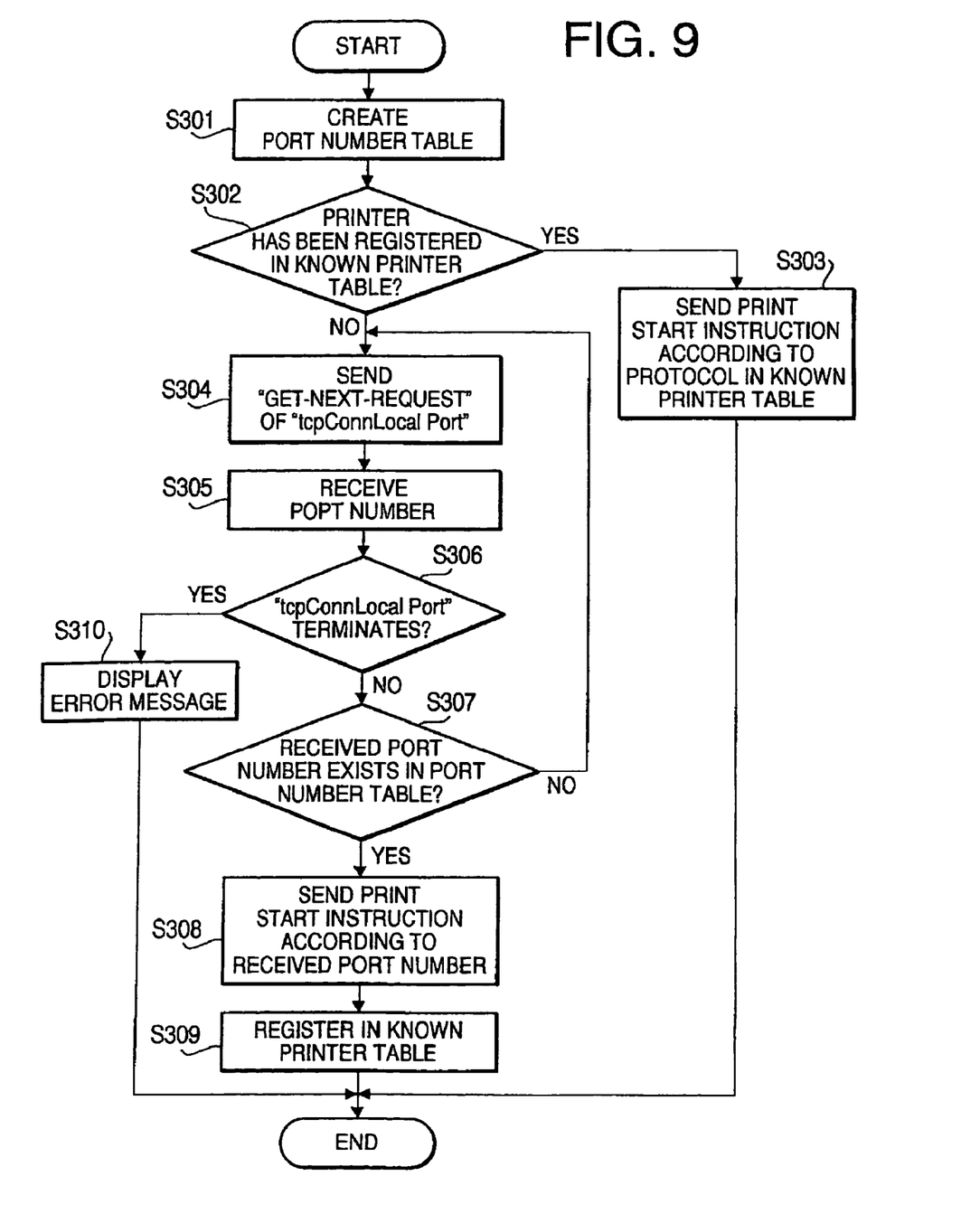
FIG. 9 is a flowchart illustrating a connection control process between the PC and the printer according to a third embodiment.
Figure 10:
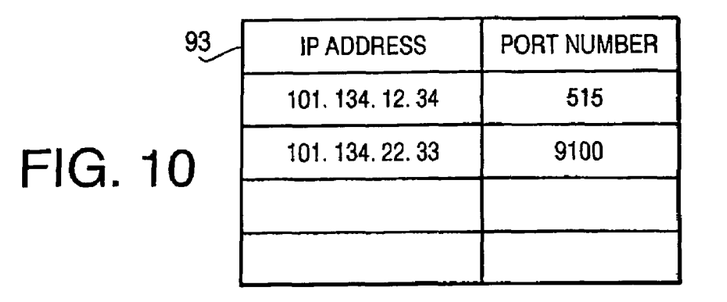
FIG. 10 is an example of a known printer table which a CPU of the PC generates.

A third embodiment of the present invention will be described with reference to FIGS. 9 and 10. FIG. 9 is a flowchart illustrating a connection control process for connecting the PC 2 (a user's terminal device) to the printer 1 (a target printer). FIG. 10 is an example of a known printer table 93 which the CPU 20 generates. It should be noted that the connection control process shown in FIG. 9 is executed under control of the CPU 20 in the PC 2. Further, it should be noted that the third embodiment corresponds to a variation of the first embodiment.

As shown in FIG. 9, initially, the CPU 20 generates the port number table, and stores the port number table in the port number area 23a (step S301).

As described above in the first embodiment, if the Windows® runs on the PC 2, the port numbers are automatically stored in the port number area 23a when the Port Monitor is installed in the PC 2.

Next, the CPU 20 refers to the known printer table 93 so as to determine whether the printer 1 (i.e., a printer to be used) has been registered in the known printer table 93 (S302). As shown in FIG. 10, in the known printer table 93, IP (Internet Protocol) addresses and port numbers of known printers are listed. It should be noted that another type of information for locating the target printer such as a printer name may be associated with each printing protocol listed in the known printer table 93.

If the target printer 1 has already been registered in the known printer table 93 (step S302:YES), the CPU 20 obtains from the known printer table 93 the printing protocol which is associated with the IP address of the target printer 1 and sends print data and a print start instruction to the target printer 1 using the printing protocol obtained from the table 93 (S303). Then, the connection control process terminates.

When the CPU 20 determines that the target printer 1 has not been registered in the known printer table 93 (S302:NO), the CPU 20 sends "GET-NEXT-REQUEST" of SNMP to the target printer 1 so as to obtain a value of "tcpConnLocalPort" (i.e., a port number which the printer 1 supports) (S304). Next, the CPU 20 receives the port number from the printer 1 (S305). Then, the CPU 20 determines whether the "tcpConnLocalPort" terminates or not (S306).

When the CPU 20 determines that "tcpConnLocalPort" does not terminate (S306:NO), the CPU 20 refers to the port number table to determine whether the port number received at step S305 exists in the port number table (S307). When the CPU 20 determines that the port number received at step S305 does not exist in the port number table (S307:NO), control returns to step S304 where the CPU 20 sends "GET-NEXT-REQUEST" again.

When the CPU 20 determines that the port number received at step S305 exists in the port number table (S307:YES), the CPU 20 sends print data and instructions to the printer 1 using the printing protocol corresponding to the received port number so as to start the printing operation (S308).

In step S309, the CPU 20 registers the IP address of the printer 1 and the received port number into the known printer table 93. Then, the connection control process terminates.

When the CPU 20 determines that "tcpConnLocalPort" terminates (S306:YES), the CPU 20 displays error messages on the display unit 24 indicating that the printing operation can not be performed (S310). Then, the connection control process terminates.

It should be appreciated that, in addition to advantages of the first embodiment, the third embodiment has an advantage in that it eliminate unnecessary transmission of "GET-NEXT-REQUEST" to the target printer. That is, the PC 2 is not required to send "GET-NEXT-REQUEST" to the target printer when the target printer is registered in the known printer table 93.

As can be seen from FIG. 9, the connection control process of the third embodiment is accomplished by adding steps for utilizing the known printer table 91 to the connection control process of the first embodiment. It should also be appreciated that, similarly to the third embodiment, the connection control process of the second embodiment can be changed so as to include the steps for utilizing the known printer table.

Forth Embodiment

A fourth embodiment of the present invention will be described with reference to FIGS. 11-14. The feature of the fourth embodiment is that each printer (i.e., printer 1) on the LAN 106 broadcasts port number information. Therefore, in this embodiment, the terminal device (104 or 105) which is participating in the LAN 106 is not required to send "GET-NEXT-REQUEST" of SNMP so as to receive the port number information from a target printer.

Figure 11:
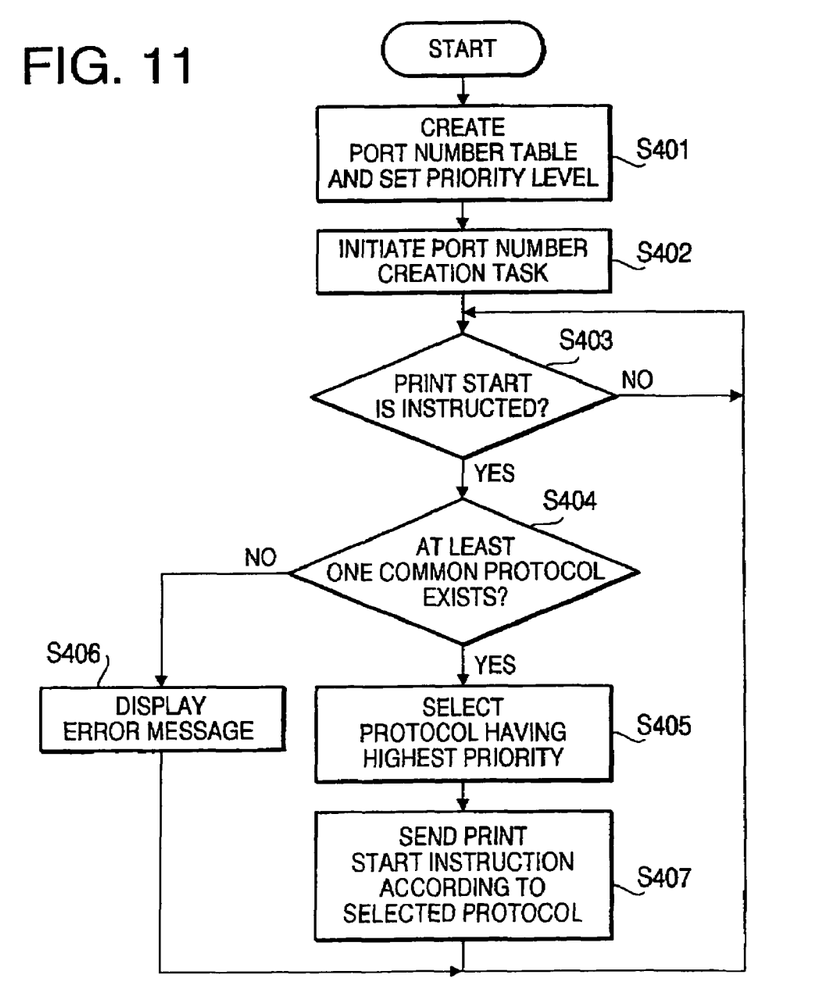
FIG. 11 is a main flowchart illustrating a connection control process running on a user's terminal device according to a forth embodiment.
Figure 12:
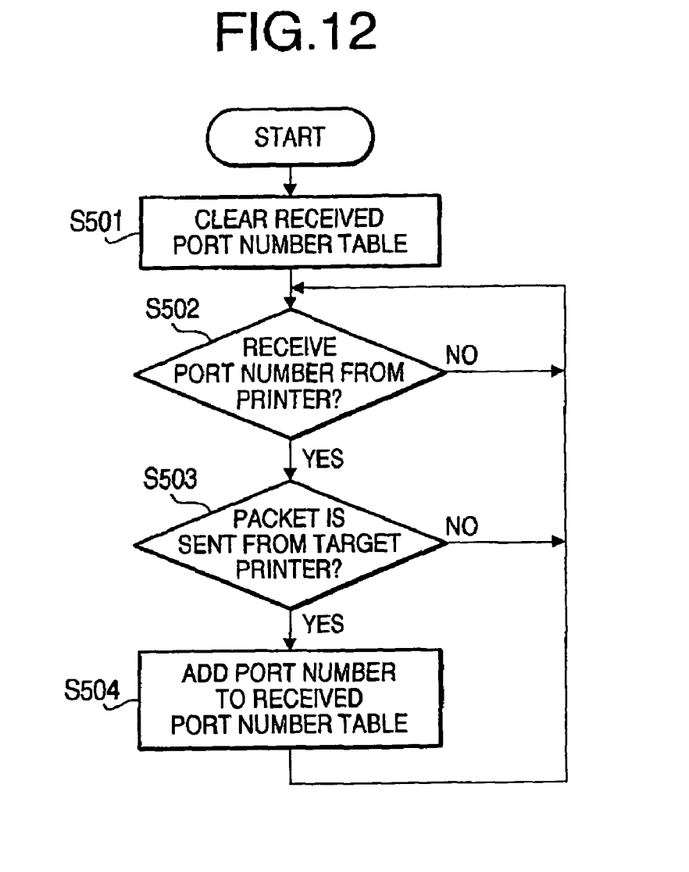
FIG. 12 is a flowchart illustrating a received port number table creation task running on the PC.
Figure 13:
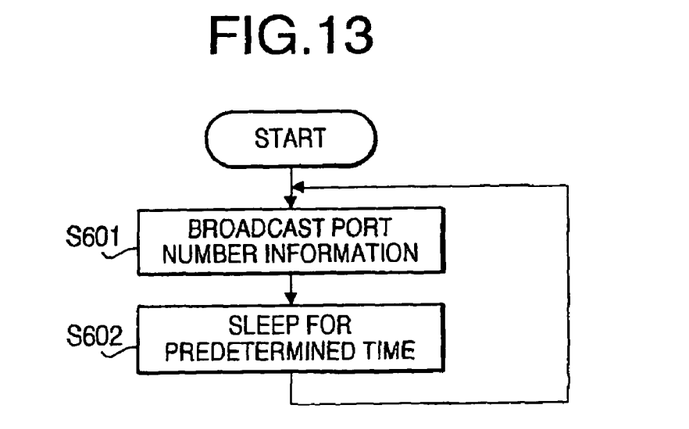
FIG. 13 is a flowchart illustrating a port number transmission process running on the printer.

FIG. 11 is a main flowchart illustrating a connection control process running on a user's terminal device (i.e., the PC 2) according to the forth embodiment. FIG. 12 is a flowchart illustrating a received port number table creation task running on the PC 2. FIG. 13 is a flowchart illustrating a port number transmission process running on the printer 1 (i.e., each of the printers 101, 102 and 103). It should be noted that the process shown in each of FIGS. 12 and 13 is executed under control of the CPU 20 of the PC 2. The process shown in FIG. 13 is executed under control of the CPU 10 in the printer 1.

Similarly to the step S201 in FIG. 6 of the second embodiment, the user makes a port number table through the use of the dialog window 30 and determines priority levels of printing protocols listed in a port number table (step S401). Then, the CPU 20 initiates a received port number table creation task (FIG. 12).

Next, the CPU 20 determines whether the user instructed the PC 2 to start printing operation through the operation unit 25. When the CPU 20 determines that the user instructed to the PC2 to start printing operation (S403:YES), the CPU 20 refers to the port number table (not shown) and a received port number table so as to determine whether at least one of the protocols listed in the received port number table exists in the port number table (S404). That is, at least one common protocol which is listed in both of the port number table and the received port number table is searched.

When the CPU 20 determines that the at least one common protocol is found (S404:YES), one protocol having highest priority level among the at least one common protocol is selected (S405). In step S406, the CPU 20 sends print data and a print start instruction using the selected printing protocol so as to start printing operation. Then, the connection control process terminates.

When the CPU 20 determines that the at least one common protocol is not found (S404:NO), the CPU 20 display error messages on the display unit 24. Then, the connection control process terminates.

When the CPU 20 determines that the user does not instruct the PC 2 to start printing operation (S403:NO), the CPU 20 repeats the step S403.

Next, the received port number creation task shown in FIG. 12 will be described. Initially, the CPU 20 clears data previously stored in the received port number table. Then, the CPU 20 determines whether the port number information is received from the printer 1 (S502).

When the CPU 20 determines that the port number information is not received (S502:NO), the CPU 20 repeats step S502. When the CPU 20 determines that the port number information is received (S502:YES), then the CPU 20 further determines whether a packet containing the port number information is transmitted from a target printer to be used (S503).

When the CPU 20 determines that the packet is not transmitted from the target printer (S503:NO), control returns to step S502. When the CPU 20 determines that the packet is transmitted from the target printer (S503:YES), the CPU 20 registers the port number transmitted from the target printer into the received port number table (S504). Then, control returns to step S502.

Next, the port number transmission process running on the printer 1 will be described. For example, when the printer 1 is switched on, the port number transmission process is initiated. Initially, the CPU 10 of the printer 1 broadcasts the port number information which the printer 1 supports trough the LAN 3. In step S602, the CPU 10 sleeps for a predetermined time period. Then, control returns to step S601.

In the example of FIG. 13 the broadcast of the port number information is repeated at the predetermined time intervals, however, it is appreciated that the broadcast can be executed at various timings.

Although the present invention has been described in considerable detail with reference to certain preferred embodiments thereof, other embodiments are possible. For example, if the terminal device and the printer communicate with each other according to a protocol such as Netware, and Apple-Talk, other types of MIB objects such as "prtChannelType" of PRINT MIB can be used in place of the "tcpConnLocalPort".

Alternative to using the SNMP, other network management protocols such as a CMIP (Common Management Information Protocol) and a managing protocol provided by a network software vendor may be used to inquire printing protocols which a printer on the network supports.

Although, in the above mentioned embodiments, the printer is connected to the LAN, the present invention can be applied to a system in which the printer is directly connected to the PC 2 and is used as a local device of the PC 2.

Although, in the above mentioned first through third embodiments, the printer 1 serves as the SNMP agent, a variation in which one of the terminal devices serves as a server which provide printing protocol information of printers on a network. In this variation, if the PC 104 is a user's terminal device and the PC 105 is the server, the PC 104 sends a request for printing protocol information to the PC 105, and then the PC 105 provides the information in reply to the request from the PC 104. The information provided by the server (PC 105) may be a printing protocol of a target printer or may be printing protocols of all of printers connected to the network.

The present disclosure relates to the subject matter contained in Japanese Patent Application No. 2002-248063, filed on Aug. 28, 2002, which is expressly incorporated herein by reference in its entirety.

What is claimed is:

1. A method of connecting a terminal device to a target printer to be used on a network, the method comprising the steps of:
   receiving from an external device information regarding printing protocols; and
   determining a printing protocol for connecting the terminal device to the target printer based on the information received;
   wherein the determining step includes comparing printing protocols which the terminal device supports with a printing protocol contained in the received information,
   the receiving step is repeated until the printing protocol contained in the received information coincides with one of the printing protocols which the terminal device supports, and
   the printing protocol which is firstly identified to be consistent with the one of the printing protocols which the terminal device supports is used to connect the terminal device to the target printer.

2. The method according to claim 1, further comprising the step of sending a request for the information regarding printing protocols from the terminal device to the external device on the network before the receiving step,
   wherein the information regarding printing protocols is transmitted from the external device to the terminal device.

3. The method according to claim 2, wherein the external device is one of a server and the target printer.

4. The method according to claim 1, wherein the information regarding printing protocols is broadcasted by the external device on the network.

5. The method according to claim 4, wherein the external device is one of printers on the network.

6. The method according to claim 4, wherein the external device is a server on the network.

7. The method according to claim 4, wherein the external device broadcasts the information regarding printing protocols when the external device is switched on.

8. The method according to claim 4, wherein the external device broadcasts the information regarding printing protocols at predetermined time intervals.

9. The method according to claim 1, further comprising the step of connecting the terminal device to the target printer in accordance with the printing protocol determined by the determining step.

10. The method according to claim 9, further comprising the steps of:
    storing the printing protocol for connecting to the target printer determined in the determining step and information for locating the target printer in a memory; and
    deciding in advance of the receiving step whether the target printer has already been stored in the memory;
    wherein if the target printer has been stored in the memory, said connecting step is performed without performing said receiving step and said determining step.

11. The method according to claim 10, wherein the information for locating the target printer includes at least one of an IP address of the target printer and a name of the target printer.

12. The method according to claim 1, further comprising the step of defining priority levels regarding printing protocols before the determining step,
    wherein said determining step includes comparing the printing protocols which the terminal device supports with printing protocols contained in the received information to determine if there are matches, and selecting one printing protocol having a highest priority level from among said matches.

13. The method according to claim 12,
    wherein said defining step includes defining said priority levels of printing protocols which the terminal device supports at the terminal device.

14. The method according to claim 12,
    wherein said defining step includes defining said priority levels which the target printer supports at the target printer.

15. The method according to claim 2,
    wherein said request is sent according to a Simple Network Management Protocol, and
    wherein the information regarding printing protocols includes information managed according to a Management Information Base.

16. A computer program stored on a computer-readable medium, the program usable to achieve a method of connecting a terminal device to a target printer to be used on a network, the program comprising:
    instructions for receiving information regarding printing protocols; and
    instructions for determining a printing protocol for connecting the terminal device to the target printer based on then information received
    wherein the determining step includes comparing printing protocols which the terminal device supports with a printing protocol contained in the received information,
    the receiving step is repeated until the printing protocol contained in the received information coincides with one of the printing protocols which the terminal device supports, and
    the printing protocol which is firstly identified to be consistent with the one of the printing protocols which the terminal device supports is used to connect the terminal device to the target printer.

17. A terminal device, comprising:
    an interface to connect with a network; and
    a connection control system that receives information regarding printing protocols from an external device on the network, and compares printing protocols which said terminal device supports with a printing protocol contained in the received information, wherein said connection control system repeats said receiving and said comparing until the printing protocol contained in received information coincides with one of the printing protocols which said terminal device supports, wherein said connection control system uses a printing protocol which firstly identified to be consistent with one of the printing protocols which said terminal device supports so as to connect said terminal device to a target printer.

* * * * *